May 15, 1945.  P. L. BOURQUE  2,375,836
ELECTRODE HOLDER
Filed Jan. 17, 1944    2 Sheets-Sheet 1
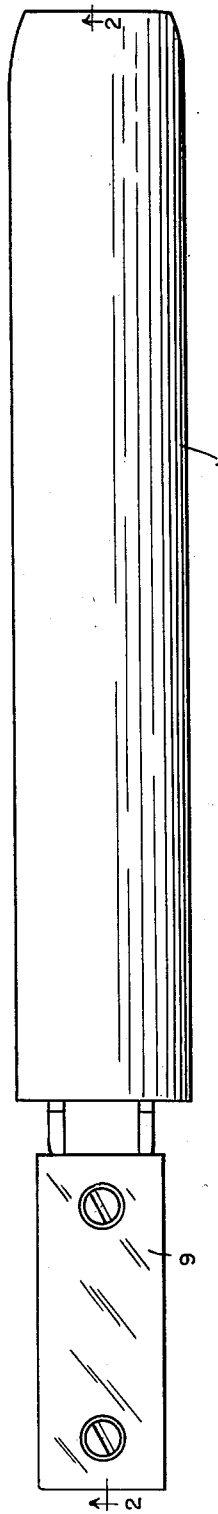
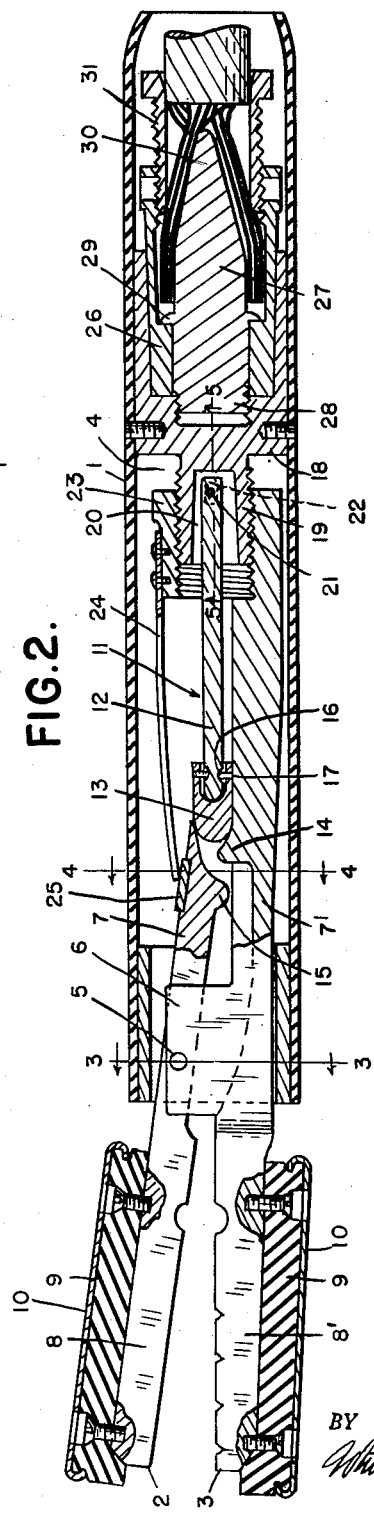
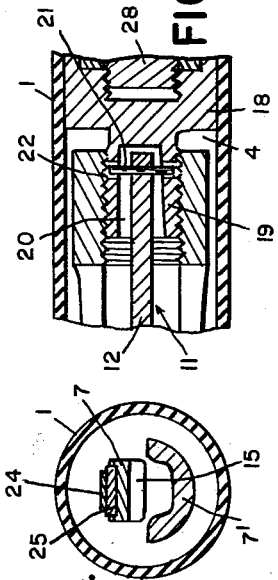
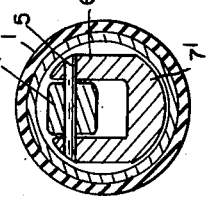
INVENTOR.
PHILIP L. BOURQUE
BY
ATTORNEYS May 15, 1945.　　　P. L. BOURQUE　　　2,375,836
ELECTRODE HOLDER
Filed Jan. 17, 1944　　　2 Sheets-Sheet 2

INVENTOR.
PHILIP L. BOURQUE
BY
ATTORNEYS

Patented May 15, 1945

2,375,836

UNITED STATES PATENT OFFICE 2,375,836

ELECTRODE HOLDER

Philip L. Bourque, Detroit, Mich.

Application January 17, 1944, Serial No. 518,571

3 Claims. (Cl. 219—8)

The invention relates to electrode holders for use in arc welding.

The invention has for one object to provide an improved electrode holder comprising a handle and jaws which are relatively movable upon relative rotation of the handle and jaws by an actuating member having a universal joint connection with the handle.

The invention has for another object to provide an improved cable connector for supplying electric welding current to the electrode.

The invention has for a further object to provide an electrode holder which is relatively simple in construction and which may be readily manipulated.

With these as well as other objects in view, the invention resides in the novel features of construction and combinations and arrangements of parts as more fully hereinafter set forth.

In the drawings—

Figure 1 is a plan view of an electrode holder embodying the invention;

Figure 2 is a cross section on the line 2—2 of Figure 1;

Figure 6:
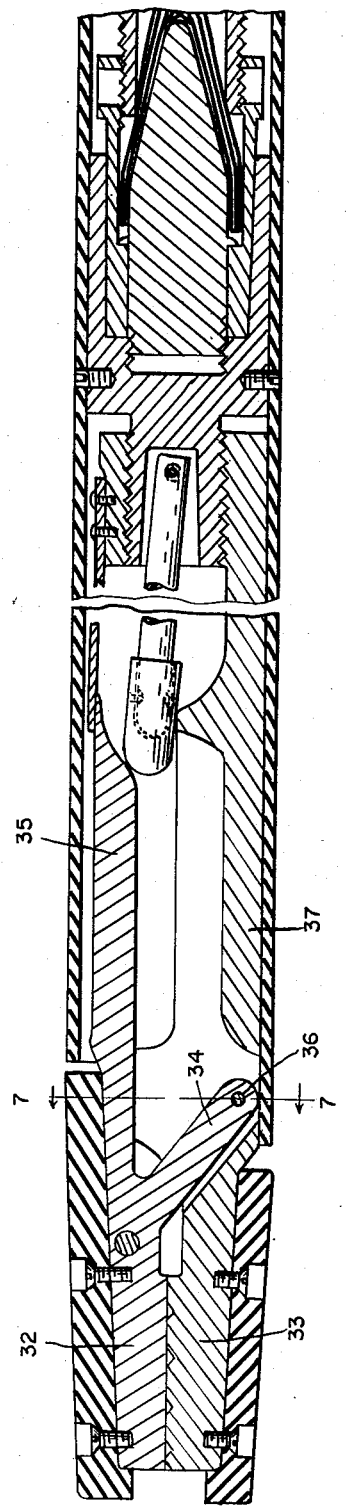
Figure 7:
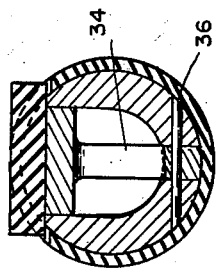

Figures 3, 4 and 5 are cross sections on the lines 3—3, 4—4, and 5—5, respectively, of Figure 2;

Figure 6 is a view similar to a portion of Figure 2 showing another embodiment of the invention;

Figure 7 is a cross section on the line 7—7 of Figure 6.

Referring to Figures 1 to 5, inclusive, the electrode holder comprises the handle 1, the relatively movable jaws 2 and 3 carried by the handle, and the combined actuating and cable connector mechanism 4 also carried by the handle. The handle is formel of suitable insulation material and is tubular. The jaws are formed of suitable electrical conducting material and are pivotally connected to each other intermediate their ends by the pivot pin 5 which extends through the jaw 2 and the laterally spaced ears 6 upon the jaw 3. The jaws have the inner end portions 7 and 7' which extend within the handle and which include the portions through which the pivot pin 5 extends. The jaws also have the outer end portions 8 and 8' located beyond the handle and shaped to clamp the electrode. The outer end portions have secured thereto the blocks 9, formed of suitable insulation material, and these blocks are protected by the sheet metal shields 10.

For relatively swinging the jaws about the pivot pin 5 to move their outer end portions 8 and 8' into clamping position, there is the actuating member 11 which is engageable with the inner end portions 7 and 7' of the jaws upon relative rotation of the handle and jaws to relatively move the outer end portions of the jaws toward each other. The actuating member 11 comprises the rod 12 and the cap 13 swiveled upon the rod and forming a cam or wedge engageable with the curved surface of the rib 14 of the inner end portion 7 of the jaw 3 and also the curved surface of the enlargement 15 at the free end of the inner end portion 7 of the jaw 2. As shown, the rod is formed with the annular groove 16 and the cap has secured thereto the screws 17 for extending into the annular groove, the arrangement being such that the rod abuts the cap when the rod is urged in a direction to relatively move the jaws to clamping position. It will be noted that the cooperating bearing surfaces upon the rod and cap are substantially hemi-spherical. The end of the rod 12 remote from the cap 13 has a universal joint connection with the member 18 which is located within and secured to the handle 1. The member 18 has the externally threaded axially extending portion 19 which is formed at its end with the axially extending recess 20 into which the rod 12 extends. The rod and externally threaded portions are pivotally connected together by the transverse pin 21, the ends of which preferably extend through diametrically opposite elongated slots 22 in the externally threaded portion 19. These slots are parallel to the axis of the externally threaded portion, the construction being such that the transverse pin and axially elongated slots form a universal joint connection. The externally threaded portion 19 extends within and engages the internally threaded annular portion 23 at the free inner end of the inner end portion 7' of the jaw 3. The arrangement is such that by relatively rotating the handle 1 and the jaws 2 and 3 the externally threaded portion 19 of the member 18 threads into or out of the internally threaded annular portion 23 of the jaw 3, depending upon the direction of rotation, to thereby compel longitudinal movement of both jaws 2 and 3 into or out of the handle 1. As a result, it will be seen that when the jaws 2 and 3 are moved inwardly relative to the handle, the cap 13 of the actuating member 11 cams or wedges the inner end portion 7 of the jaw 2 away from the inner end portion 7' of the jaw 3 to relatively move the outer end portions of the jaws toward each other and into clamping relation with the electrode.

For the purpose of normally maintaining the clamping jaws out of clamping position, I have provided the leaf spring 24 which is fixedly secured at one end to the internally threaded annular portion 23 and which bears at the other end upon the plate 25 formed of suitable insulation material, this plate being secured to the inner end portion 7 of the jaw 2. The purpose of the insulation plate is to avoid carrying of the electric welding current through the spring.

For connecting the cable to the holder and, more particularly, to the jaws, the member 18 which forms a part of the actuating mechanism is also made to form a part of the cable connector so that it will be seen that the actuating and cable connector mechanism 4 has a part in common. In detail, 26 is a cup-shaped housing fitting within the outer end portion of the member 18, the engaging surfaces preferably being frusto-conical. 27 is a post having the threaded shank 28 extending through the bottom of the housing 26 and axially threaded into the member 18. The post also has the annular flange 29 for clamping the housing 26 to the member 18. The post further has the outer end portion 30 which is tapered. An annular space is provided between that portion of the post outwardly beyond the bottom of the housing and the housing to receive the ends of the strands of the cable and they are effectively clamped in place by the abutment member or nut 31 which is threaded into the outer end portion of the housing. It will be seen that electric welding current is carried through the cable to the member 18 to the jaws 2 and 3 and from these jaws to the electrode which is clamped between the jaws to the work being arc welded.

In the modification illustrated in Figures 6 and 7, the construction of the electrode holder is generally the same as that illustrated in Figures 1 and 5, inclusive, with the exception that the jaws 32 and 33 are pivotally connected in a manner to secure more complete opening of their outer end clamping portions with the same relative angular movement as the jaws of Figures 1 to 5, inclusive. In detail, the jaw 32 is formed with the arm 34 which is inclined at an acute angle to the inner end portion 35 of the jaw 32. 36 is a pivot pin extending through the end of the arm and also through the inner end portion 37 of the jaw 33 for pivotally connecting the jaws to each other. With this arrangement, the pivot pin is positioned longitudinally of the electrode holder a substantial distance from the nearest parts of the outer end clamping portions of the jaws to secure more complete opening.

What I claim as my invention is:

1. An electrode holder comprising a handle, a pair of pivotally connected jaws having portions extending within said handle, one of said portions having an annular internally threaded part, a member within and secured to said handle and having an externally threaded part engaging said internally threaded part and an actuating member for swinging one of said jaws comprising a rod having a universal joint connection with said externally threaded part, and a cap swiveled on said rod and having cam engagement with said last mentioned jaw.

2. An electrode holder comprising a hollow handle, a pair of pivotally connected jaws having shank portions extending into said hollow handle, one of said shank portions having a channel cross section engaging the other shank portion and supporting the pivotal connection therebetween, also having an annular internally threaded portion at its inner end, a member within said hollow handle having an outwardly projecting hollow portion externally threaded to engage said internally threaded portion of said shank, a rod having its inner end within said hollow portion and extending outward therefrom, a cross pin connected to the inner end of said rod and engaging slots in the wall of said hollow portion to form in effect a universal joint connection therewith, and a cap swiveled on the outer end of said rod and engaging cam faces on said shank members.

3. An electrode holder comprising a hollow handle, a pair of pivotally connected jaws having shank portions extending into said hollow handle, one of said shank portions having a channel cross section engaging the other shank portion and supporting the pivotal connection therebetween, also having an annular internally threaded portion at its inner end, a member within said hollow handle having an outwardly projecting hollow portion externally threaded to engage said internally threaded portion of said shank, a rod having its inner end within said hollow portion and extending outward therefrom, a cross pin connected to the inner end of said rod and engaging slots in the wall of said hollow portion to form in effect a universal joint connection therewith, a cap swiveled on the outer end of said rod and extending between cam faces on said shank members, and a leaf spring connected to the outer surface of said internally threaded portion and extending therefrom to bear on the other shank portion, said spring being biased to move said jaws to open position.

PHILIP L. BOURQUE.